(12) United States Patent
Bala et al.

(10) Patent No.: US 11,068,746 B2
(45) Date of Patent: Jul. 20, 2021

(54) IMAGE REALISM PREDICTOR

(71) Applicant: Palo Alto Research Center Incorporated, Palo Alto, CA (US)

(72) Inventors: Raja Bala, Pittsford, NY (US); Matthew Shreve, Mountain View, CA (US); Jeyasri Subramanian, Sunnyvale, CA (US); Pei Li, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 214 days.

(21) Appl. No.: 16/235,697

(22) Filed: Dec. 28, 2018

(65) Prior Publication Data
US 2020/0210770 A1   Jul. 2, 2020

(51) Int. Cl.
*G06K 9/62* (2006.01)
*G06K 9/00* (2006.01)
*G06T 7/00* (2017.01)

(52) U.S. Cl.
CPC ....... *G06K 9/6257* (2013.01); *G06K 9/00221* (2013.01); *G06K 9/6253* (2013.01); *G06K 9/6255* (2013.01); *G06T 7/0002* (2013.01); *G06T 2200/24* (2013.01); *G06T 2207/20081* (2013.01); *G06T 2207/20084* (2013.01); *G06T 2207/20221* (2013.01); *G06T 2207/30168* (2013.01)

(58) Field of Classification Search
CPC ............. G06K 9/6257; G06K 9/00221; G06K 9/6253; G06K 9/6255; G06K 9/6271; G06K 9/00664; G06K 9/6256; G06K 9/00; G06T 7/0002; G06T 2200/24; G06T 2207/20081; G06T 2207/20084; G06T 2207/20221; G06T 2207/30168; G06T 2207/20092; G06T 2207/30201
See application file for complete search history.

(56) References Cited

U.S. PATENT DOCUMENTS

| 8,406,994 B1 * | 3/2013 | Pu ..................... G01C 21/3638 |
| | | 701/408 |
| 2018/0121768 A1 * | 5/2018 | Lin ..................... G06K 9/4628 |
| 2018/0285535 A1 * | 10/2018 | Zhu ........................ G06T 7/30 |

(Continued)

OTHER PUBLICATIONS

Barratt et al., "A Note on the Inception Score", arXiv, Jan. 2018, 9 pages.

(Continued)

*Primary Examiner* — Carol Wang
(74) *Attorney, Agent, or Firm* — Mueting Raasch Group

(57) ABSTRACT

A method for predicting the realism of an object within an image includes generating a training image set for a predetermined object type. The training image set comprises one or more training images at least partially generated using a computer. A pixel level training spatial realism map is generated for each training image of the one or more training images. Each training spatial realism map configured to represent a perceptual realism of the corresponding training image. A predictor is trained using the training image set and the corresponding training spatial realism maps. An image of the predetermined object is received. A spatial realism map of the received image is produced using the trained predictor.

19 Claims, 7 Drawing Sheets

(56) References Cited

U.S. PATENT DOCUMENTS

2019/0295223 A1* 9/2019 Shen .................... G06K 9/6256
2019/0370666 A1* 12/2019 Ros Sanchez ......... G06N 3/088

OTHER PUBLICATIONS

Best-Rowden et al., "Automatic Face Image Quality Prediction", arXiv, Jun. 29, 2017, pp. 1-13.
Earl, "Swiching Eds: Face Swapping with Python, dlib, and OpenCV", arXiv, Jul. 28, 2015, 10 pages.
Goodfellow et al., "Generative Adversarial Nets", arXiv, 2014, 9 pages.
Huesel et al., "GANS Trained by a Two Time-Scale Update Rule Converge to a Local Nash Equilibrium", arXiv, Jun. 26, 2017, 12 pages.
Liu et al., "Deep Learning Face Attributes in the Wild", arXiv, Nov. 28, 2014, 9 pages.
Mazumdar et al., "Univeral Image Manipulation Detection using Deep Siamese Convolutional Neural Network" arXiv, Aug. 20, 2018, 6 pages.
Radford et al., "Unsupervised Representation Learning with Deep Convolutional Generative Adversarial Networks", arXiv, Nov. 19, 2015, 16 pages.
Ronneberger et al., "U-Net: Convolutional Networks for Biomedical Image Segmentation" arXiv, May 18, 2015, 8 pages.
European Search Report from EP Application No. 19219917.2 dated Mar. 30, 2020, 9 pages.
Bunk et al., "Detection and Localization of Image Forgeries using Resampling Features and Deep Learning", Arxiv,org, Jul. 31, 2017, 9 pages.
Chien et al., "Detecting Nonexistent Pedestrians", 2017 IEEE International Conference on Computer Vision Workshops, Oct. 22, 2017, pp. 182-189.
Guera et al., "Deepfake Video Detection using Recurrent Neural Networks", 2018 15th IEEE International Conference on Advanced Video and Signal Based Surveillance, Nov. 27, 2018, pp. 1-6.
Rossler et al., "FaceForensics: A Large-scale Video Dataset for Forgery Detection in Human Faces", Arxiv,org, Mar. 25, 2018, 21 pages.
Zhou et al., "Two-Stream Neural Networks for Tampered Face Detection", 2017 IEEE Conference on Computer Vision and Pattern Recognition Workshops, Jul. 21, 2017, pp. 1831-1839.

* cited by examiner

IMAGE REALISM PREDICTOR

TECHNICAL FIELD

The present disclosure is directed to image processing and particularly to image prediction of image realism.

BACKGROUND

Image synthesis has long been an important research topic with many applications in entertainment, image in-painting, image-based rendering, and as a means to train and validate computer vision algorithms.

SUMMARY

Embodiments described herein involve a method for predicting the realism of an object within an image. A training image set for a predetermined object type is generated. The training image set comprises one or more training images at least partially generated using a computer. A pixel level training spatial realism map is generated for each training image of the one or more training images. Each training spatial realism map configured to represent a perceptual realism of the corresponding training image. A predictor is trained using the training image set and the corresponding training spatial realism maps. An image of the predetermined object is received. A spatial realism map of the received image is produced using the trained predictor.

Embodiments described herein involve an image realism predictor comprising a processor and a memory storing computer program instructions which when executed by the processor cause the processor to perform operations. The operations comprise generating a training image set for a predetermined object type, the training image set comprising one or more training images at least partially generated using a computer. A pixel level training spatial realism map is generated for each training image of the one or more training images. Each training spatial realism map configured to represent a perceptual realism of the corresponding training image. A predictor is trained using the training image set and the corresponding training spatial realism maps. An image of the predetermined object is received. A spatial realism map of the received image is produced using the trained predictor.

Embodiments described herein involve a system for generating a spatial realism map of an image. A receiver is configured to receive an image of a predetermined object type. A processor is configured to generate a pixel level spatial realism map of the image. The system includes a user interface comprising a display configured to display the spatial realism map.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In recent years, generative adversarial networks (GANs) have become a popular means for image synthesis. The optimization of the standard GAN is based on a statistical measure, namely conformance of the generated image to a probability distribution estimated from input training samples in a feature space. Similarly, the measures used to evaluate GAN performance are also statistically based, examples including Inception Score and Fréchet Inception Distance. The problem with a purely statistical approach is that it might ignore semantically important properties of an image such as spatial geometry. In synthesizing images of human faces, for example, there is no explicit encoding or evaluation of facial symmetry or naturalness in the GAN optimization. GAN outputs can thus produce a high inception score, but appear perceptually distorted and/or unnatural.

The other shortcoming of standard techniques for assessing image quality or realism is that GAN measures are single-valued metrics aggregated over the entire image, and do not highlight specific local regions that may be the key contributors towards the overall perceptual quality or semantic integrity. The discriminator within a typical GAN that is tasked with determining if an image is real or fake falls into this category. The mechanisms and objectives by which images are assessed (usually by humans) are fundamentally different from those by which a GAN synthesizes images. Therefore, it may be difficult to determine the perceptual realism of an image using purely GAN techniques. Embodiments described herein involve the training and application of an image realism predictor which receives an input image and puts out a spatial realism "heatmap", where high values in a given spatial region on the heatmap indicate that the region is realistic in appearance and low values indicate that the region is unrealistic in appearance. The term "image realism" herein refers to the quality of an image representing a scene or object accurately and in a way that is true to life. In some embodiments, the predictor is implemented as a deep convolutional neural network. While embodiments described herein are applicable for any type of scene content, examples describe a method for predicting the realism of images of human faces. Training of the deep face realism predictor network requires a dataset comprising computer generated facial images, and corresponding ground truth prediction maps. While synthetic images are readily generated, the prediction maps are non-trivial to acquire. According to various embodiments described herein, a method to predict the perceptual realism of computer-generated images in a spatially localized fashion may be used to determine the realism of an image of a particular object.

Figure 1:
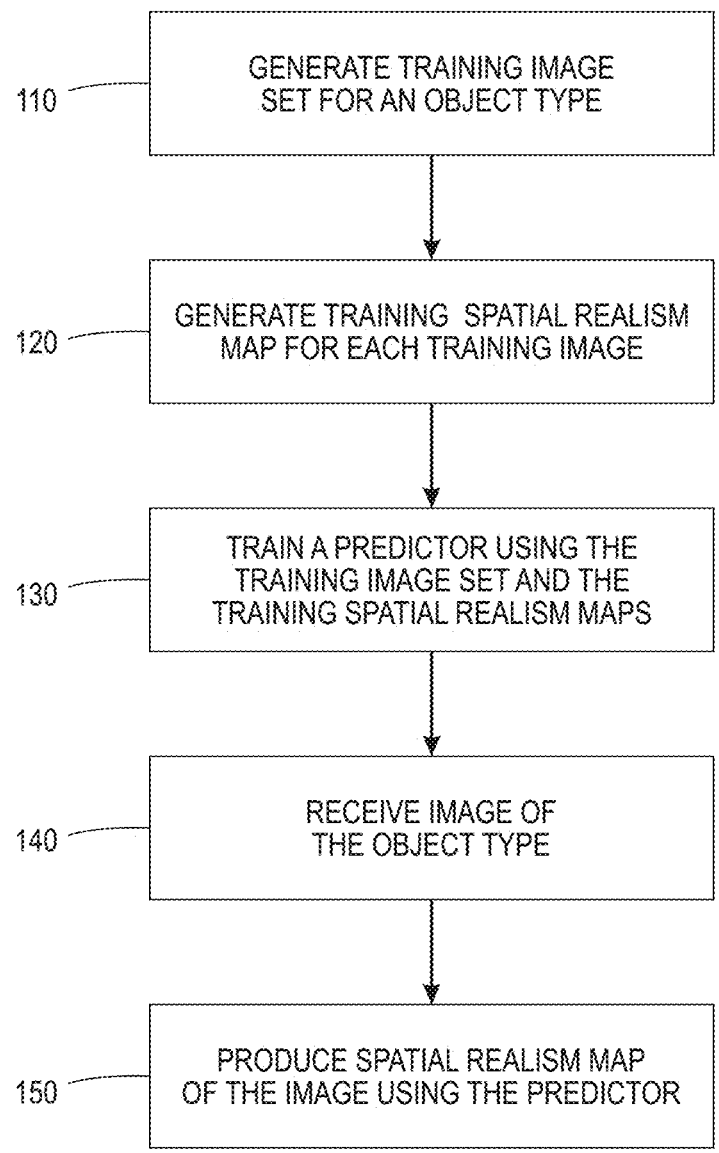
FIG. 1 illustrates a process for producing a spatial realism map of a predetermined object in accordance with embodiments described herein.

FIG. 1 illustrates a process for producing a spatial realism map of a predetermined object in accordance with embodiments described herein. A training image set for a predetermined object type is generated 110. The predetermined object type may include any type of object. For example, the predetermined object type may include one or more of human faces, animals, automobiles, and electronic equipment. According to various embodiments, one or more training images of the training image set are created using one or more of generative adversarial networks (GAN). For example, the training images can be created using one or more of a deep convolutional GAN (DCGAN), a self-attention GAN (SAGAN), and/or boundary equilibrium GAN (BEGAN). One or more of the training images of the training image set is at least partially computer generated. A training spatial realism map is generated 120 for each training image of the training image set. According to various implementations, the spatial realism map is a pixel level spatial realism map. In some cases, each spatial realism map is configured to map a perceptual realism of the respective training image.

A predictor is trained 130 using the training image set and the respective training spatial realism maps. The predictor may be implemented as a deep convolutional neural network such as a U-Net, for example. A user image is received 140 of the predetermined object type. A spatial realism map of the user image is produced 150 using the trained predictor. The image realism predictor described herein can be not only used as a final quality metric for GAN outputs, but also incorporated as a differentiable semantic prior in the GAN's loss function during optimization, for example.

Figure 2:
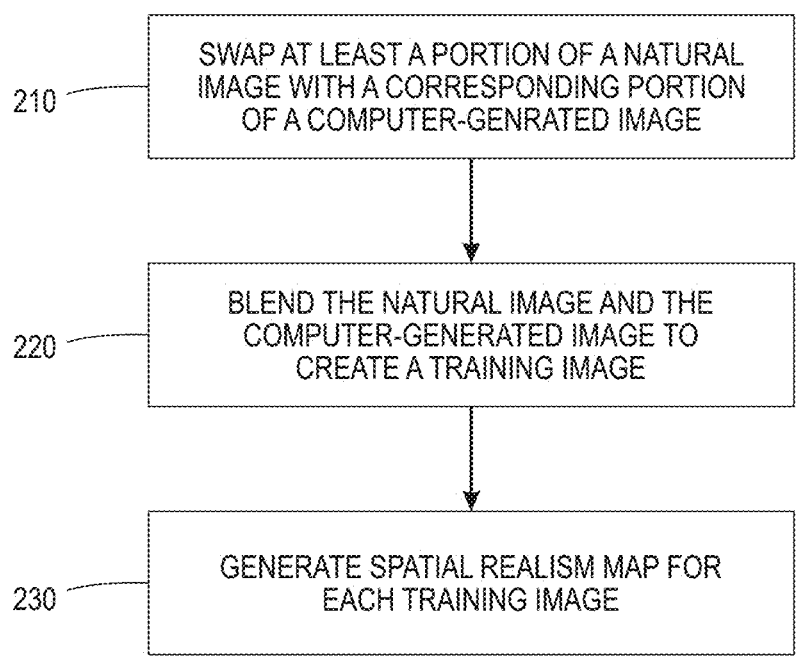
FIG. 2 illustrates a process for creating a spatial realism map using an automated process in accordance with embodiments described herein.

The training images and corresponding training spatial realism maps can be created in various ways. FIG. 2 illustrates a process for creating a spatial realism map using an automated process in accordance with embodiments described herein. According to various implementations, creating a training image of the training image set comprises distorting at least a portion of a natural image. In some cases, the corresponding spatial realism map is defined to have a low realism score in the distorted portion of the image and a high realism score in the undistorted portion of the image. According to various embodiments, distorting at least a portion of the natural image comprises swapping 210 at least a portion of the natural image with a corresponding portion of a computer-generated image. According to various configurations, the natural image comprises a natural image of a human face, for example. The swapped portion may include an eye region of the image. The borders between the natural image and the computer-generated portion may be blended 220. The training spatial realism map is generated 230 automatically based on the swapped portion, such that the swapped portion is marked with low realism scores and unaltered regions are marked with high scores.

Figure 3:
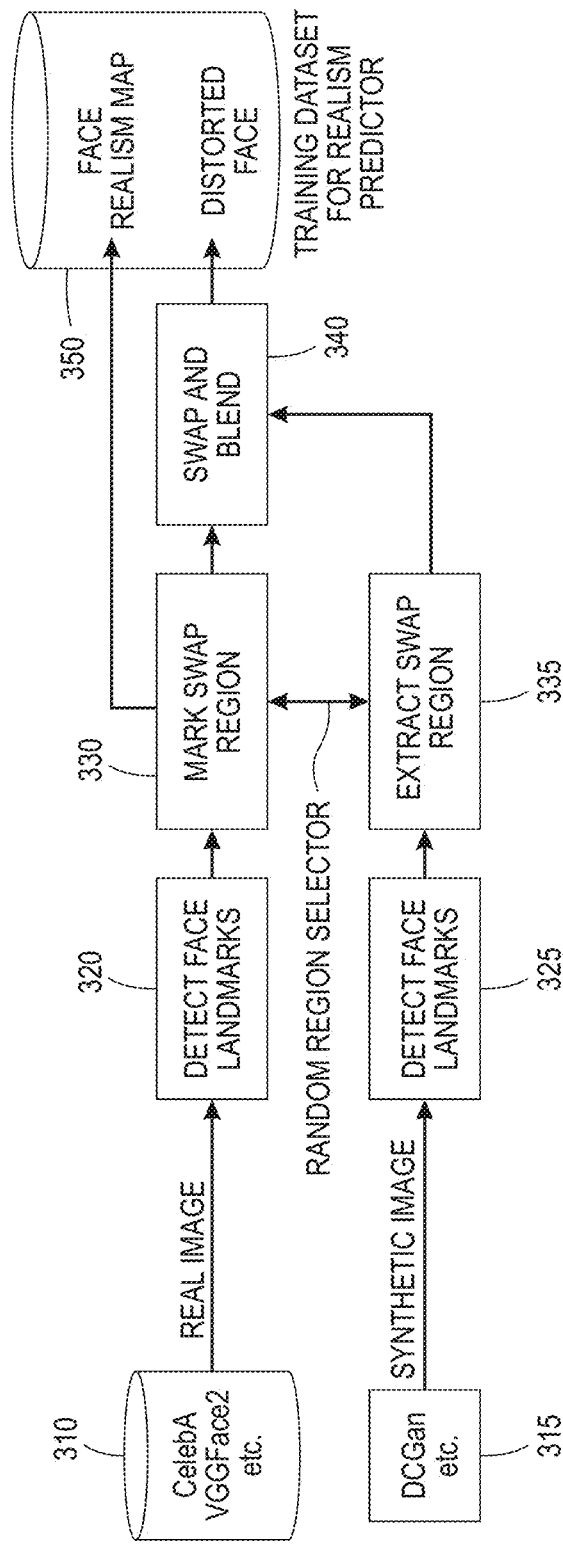
FIG. 3 illustrates a more detailed illustration of creating a training image and a corresponding spatial realism map using an automated process in accordance with embodiments described herein.

FIG. 3 illustrates a more detailed illustration of creating a training image and a corresponding training spatial realism map using an automated process in accordance with embodiments described herein. A natural image of a predetermined object type is retrieved from a database 310. According to various configurations, the natural image is uploaded using a user interface at the time of the creation of the training image. Image landmarks are detected 320 for the natural image. Using an example of a human face, the landmarks that may be detected include eyes, eyebrows, forehead, cheeks, nose, mouth, and chin. A swap region is marked 330 based on the detected image landmarks. In some cases, the system randomly chooses a landmark to use for each natural image of the training image set. According to various configurations, the same image landmark is chosen for each of the natural images of the training image set.

A computer-generated image of the predetermined object type is created 315 using a DCGAN, for example. Landmarks of the computer-generated image are detected 325. A swap region of the computer-generated image corresponding to the marked swap region of the natural image is extracted 335. The processing of the natural image and the processing of the computer-generated image may be done in series or in parallel. The extracted swap region of the computer generated image is swapped 340 into the natural image. As an example, the left eye of the natural image may be swapped with the left eye of the computer-generated image. In some cases, more than one portion of the natural image may be swapped with corresponding portions of the computer generated-images. The swapped portion of the natural image is then automatically annotated as non-realistic (e.g., realism value 0) while the rest of the image is marked as realistic (e.g., realism value 1).

To produce a visually natural and seamless swap, the newly inserted synthetic image region may be blended smoothly into the original image using Gaussian blurring and/or color correction. In such cases, the spatial realism map is processed through a low pass filter to create smooth transitions from real to computer-generated regions. The spatial realism map is stored in a database 350 and associated with the training image.

Figure 4:
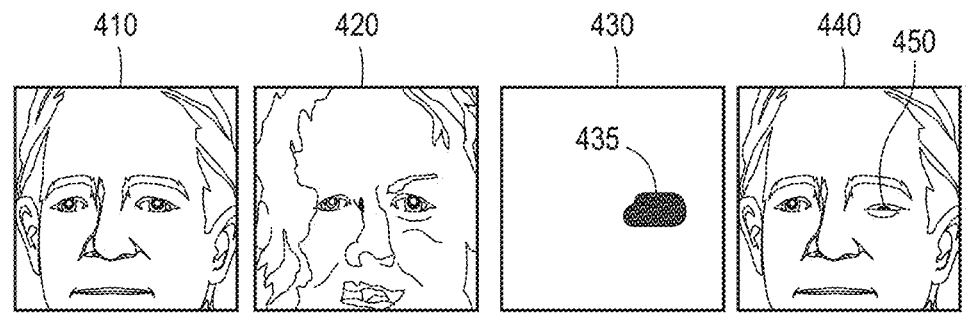
FIG. 4 shows an example automated process for creating a spatial realism map in accordance with embodiments described herein.

The process shown in FIG. 4 may be used to create a set of training images and corresponding training spatial realism maps. To assemble a large training dataset for the realism predictor, images are drawn at random from both real and computer-generated sources and swap regions are also selected at random.

FIG. 4 shows an example automated process for creating a spatial realism map in accordance with embodiments described herein. A natural image of a human face is received from a user and/or from a database. A computer generated image of a human face 420 is created. A portion of the computer-generated image is swapped with a corresponding portion 450 of the natural image resulting in a training image 440. A pixel level spatial realism map 430 is created and shows the swapped portion 435. The swapped portion 435 is given a low score and thus appears black on the training spatial realism map 430. The portion of the image that is not swapped receives a relatively high score and appears white on the spatial realism map 430.

Figure 5:
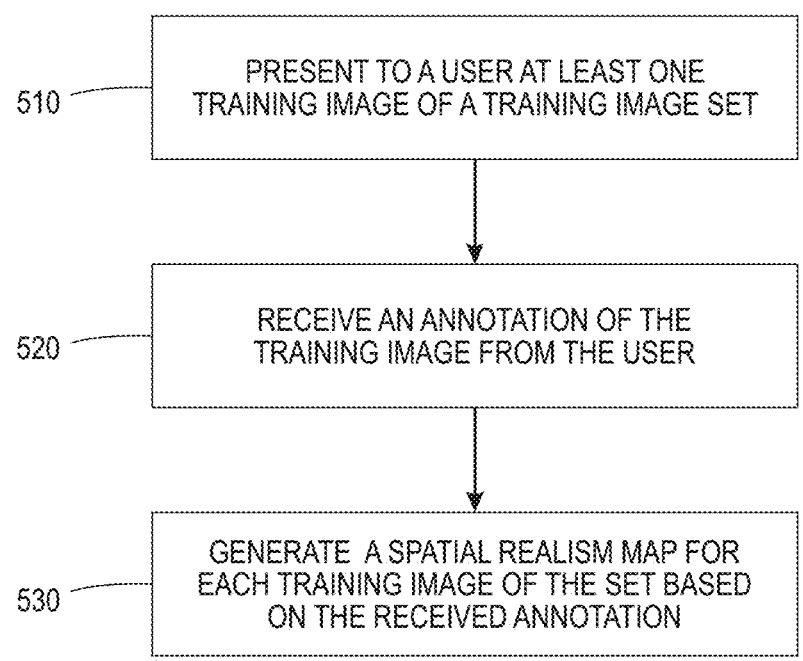
FIG. 5 illustrates a process of creating a spatial realism map using at least a partially manual process in accordance with embodiments described herein.

FIG. 5 illustrates a process of creating a spatial realism map using at least a partially manual process in accordance with embodiments described herein. At least one training image of a training image set is presented to a user 510 via a user interface. An annotated training image is received 520 from the user indicating any portions of the training image that are not realistic to the user. According to various embodiments, the annotation comprises one or more of a bounding polygon, a circle, and/or an ellipse. A spatial realism map is generated 530 based on the annotated training image. In some cases, the user may determine that no portions of the training image are unrealistic. In this case, the corresponding spatial realism map indicates that no portions of the training image are unrealistic. While embodiments described herein describe creating a training image set involves an automated process or a manual process, it is to be understood that a first portion of training images of the training image set may be created by using the automated process and a second portion of the training images may be created by using the manual process. In some cases, the automated approach is used in addition to the manual approach for all or a portion of the training images in a set.

Figure 6A:
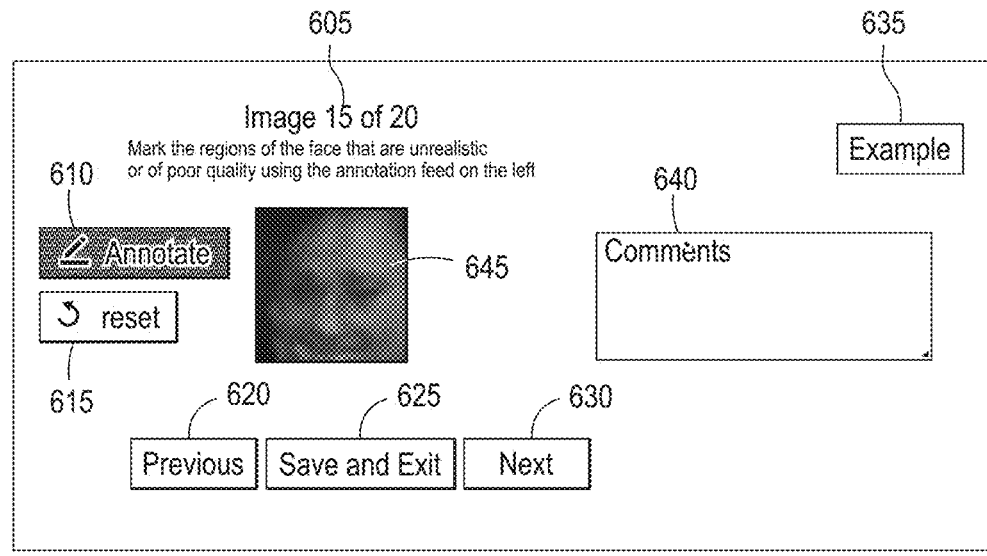
FIGS. 6A and 6B show an example graphical user interface for annotating training images in accordance with embodiments described herein.
Figure 6B:
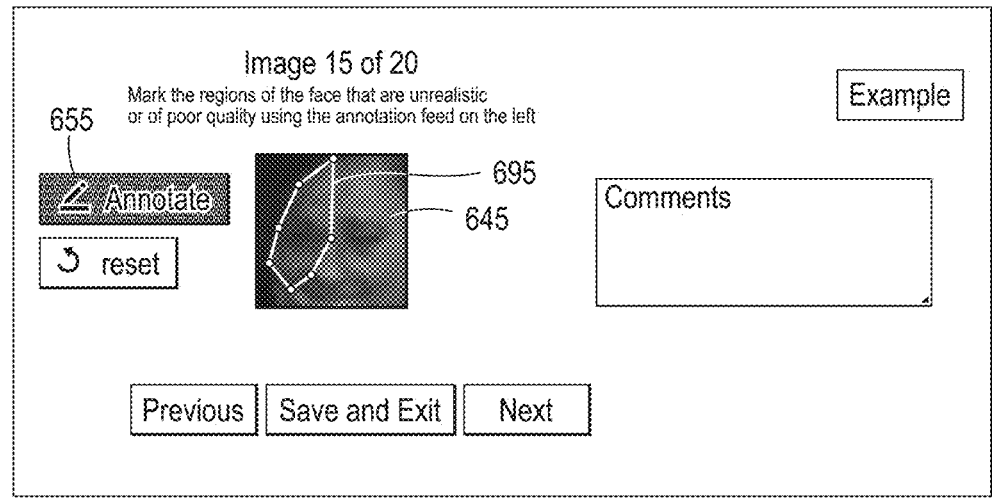

FIGS. 6A and 6B show an example graphical user interface for annotating training images in accordance with embodiments described herein. FIG. 6A shows a training image 645 of a training image set. According to various configurations, a training image is at least partially computer-generated. In some cases, the training image is completely computer-generated. The interface indicates the image number 605 of the training image set. The user is asked to identify, with a graphical tool, the regions of the training image 645 that visually appear unrealistic to the user. The user can choose to annotate the image using the annotate button 610. If the user is not satisfied with the annotated image, the user can use the reset button 615 to reset the annotation. The user can select the example button 635 to see one or more example annotations. Optionally, the user can use the comments field 640 to enter any comments to be associated with the training image 645. The user can select the previous button 620 to go back and look at a previous training image. Once the user has completed annotating the training image 645, the user can move on to the next training image by selecting the next button 630. The user can select the save and exit button 625 to exit the program.

FIG. 6B shows an example user annotation of the training image 645 shown in FIG. 6A in accordance with embodiments described herein. Once the user selects the annotate button 655, the user can select an area 695 of the training image 645. The annotated training image is used to create a spatial realism map of the training image. The spatial realism map may be similar to the spatial realism map described above in relation to the automatic process. Annotated regions of the training image may be assigned a low value such as 0 and the remaining regions are assigned a high value such as 1. In some cases, the spatial realism map is not a binary map and more than two values may be used to create the spatial realism map. In these cases, the user may be asked to give a realism score (e.g., 0-10) for different regions of the annotated portions of the image. According to various configurations, each image is annotated by multiple users and the results combined (e.g. averaged) to account for inter-observer variations.

Figure 7:
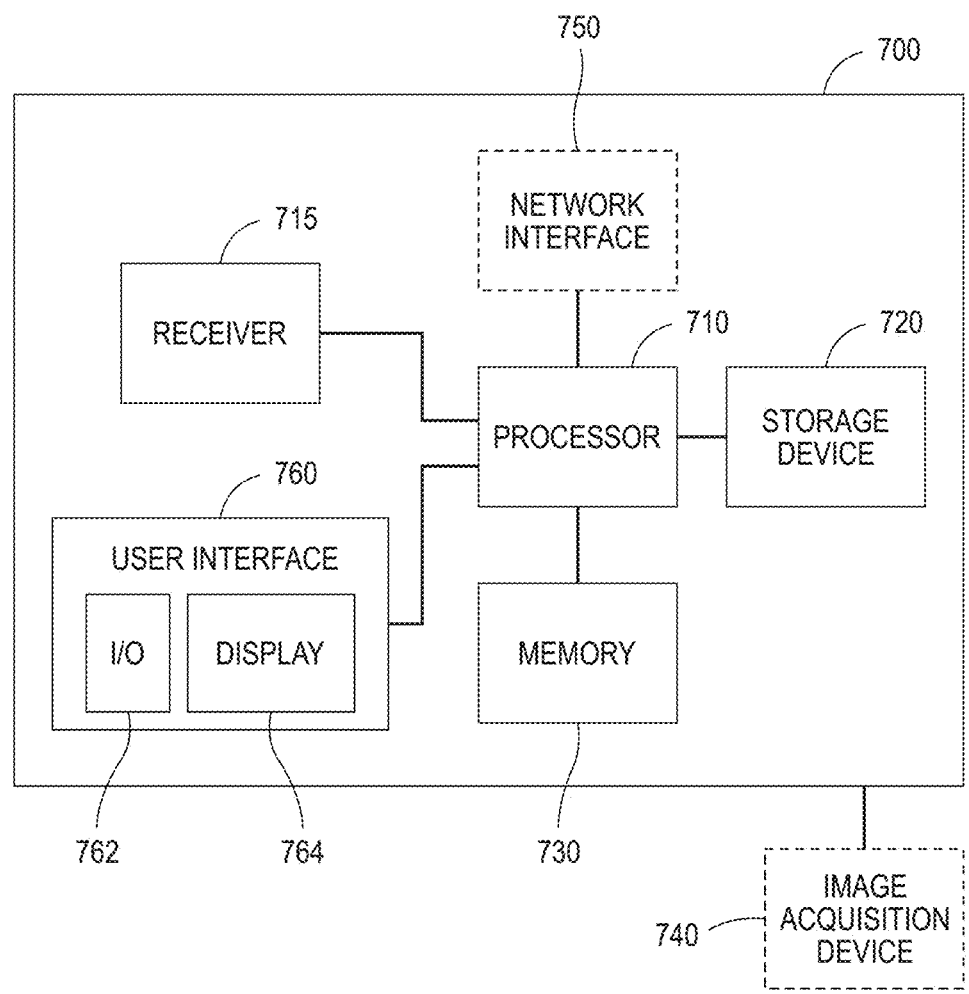
FIG. 7 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 7. Computer 700 contains a processor 710, which controls the overall operation of the computer 700 by executing computer program instructions which define such operation. The computer program instructions may be stored in a storage device 720 (e.g., magnetic disk) and loaded into memory 730 when execution of the computer program instructions is desired. Thus, the steps of the methods described herein may be defined by the computer program instructions stored in the memory 730 and controlled by the processor 710 executing the computer program instructions. The computer 700 may include one or more network interfaces 750 for communicating with other devices via a network. The computer 700 also includes a user interface 760 that enable user interaction with the computer 700. The user interface 760 may include I/O devices 762 (e.g., keyboard, mouse, speakers, buttons, etc.) to allow the user to interact with the computer. Such input/output devices 762 may be used in conjunction with a set of computer programs as an annotation tool to annotate images in accordance with embodiments described herein. The user interface also includes a display 764 for displaying images and spatial realism maps to the user. The computer may also include a receiver 715 configured to receive images from the user interface 760 or from the storage device 720. According to various embodiments, FIG. 7 is a high-level representation of possible components of a computer for illustrative purposes and the computer may contain other components.

Example

Figure 8:
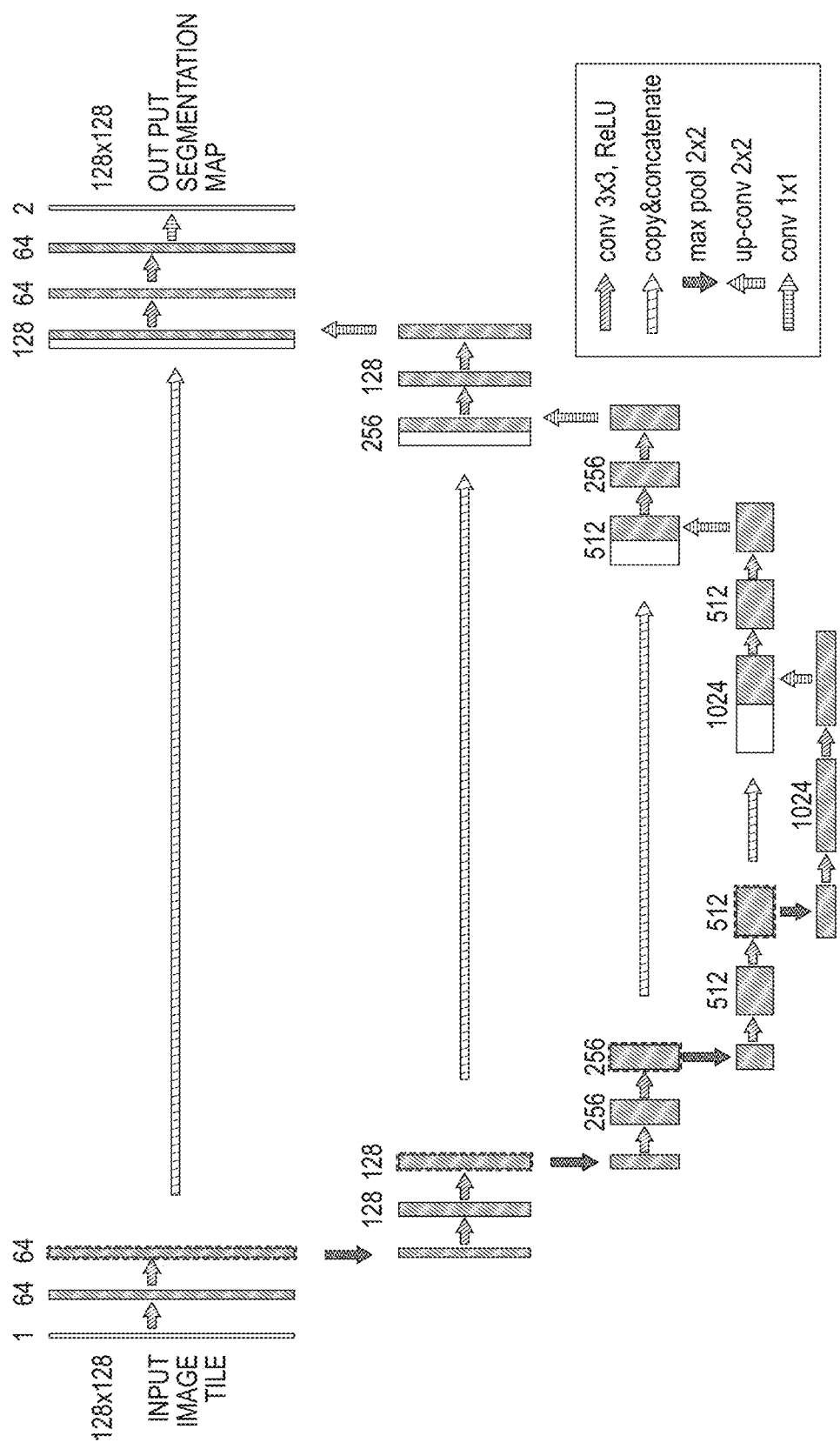
FIG. 8 illustrates an example network architecture of a face realism predictor in accordance with embodiments described herein.

A prototype face realism predictor trained using the automatic region swapping approach described herein was implemented. Face images were drawn at random from the CelebA dataset (see Z. Liu, P. Luo, a. X. Wang, and X. Tang, "Deep Learning Face Attributes in the Wild," in *Proceedings of International Conference on Computer Vision (ICCV)*, 2015) and random regions were replaced by corresponding regions extracted from synthetic outputs of a DCGAN face generator, also trained on CelebA. In order to simulate varying degrees of distortion, synthetic images from different epochs in DCGAN training were retrieved. A dataset of 30,000 images and face realism maps were generated and used to train a U-Net face realism predictor. The U-Net network architecture is shown in FIG. 8. Other neural networks may be used.

The differences between the implemented embodiment and the original U-Net implementation are as follows;
1. Instead of cropping the images while concatenating them to the corresponding deconvolution feature maps, the original feature map size was used for the concatenation. In this case, the size of the output prediction map is the same as that of the input image;
2. the input image is resized to 128*128 for training and testing;
3. instead of using binary masks as ground-truth, smoothed continuous-valued masks were used indicative of the smooth blending of the swapped region into the image;
4. instead of using softmax, sigmoid was used in the last layer; and
5. bypass connections in U-Net were disabled.

The Adam optimizer was used and initial learning rate was set to 0.0001 with decay of 0.05. 100 epochs were trained with the binary cross entropy. The final training loss reach to close tso 0.04. The results show that the unrealistic regions were quite accurately predicted by the network. The final DICE segmentation overlap coefficient was 0.88 for training samples and 0.83 for an independent set of 900 test samples.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above. The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method for predicting the realism of an object within an image, comprising:
   generating a training image set for a predetermined object type, the training image set comprising one or more training images at least partially generated using a computer;
   generating a pixel level training spatial realism map for each training image of the one or more training images, each training spatial realism map configured to represent a perceptual realism of a corresponding training image;
   training a predictor using the training image set and corresponding training spatial realism maps;
   receiving an image of the predetermined object type; and
   producing a spatial realism map of the received image using the trained predictor.

2. The method of claim 1, wherein generating a training image set for the predetermined object type comprises distorting at least a portion of a natural image, and wherein a corresponding spatial realism map is defined to have a low realism score in the distorted portion of the natural image and high realism score in undistorted portions.

3. The method of claim 2, wherein distorting at least a portion of the natural image comprises swapping at least the portion of the natural image with a corresponding portion of a computer-generated image to create a combined image.

4. The method of claim 3, further comprising smoothly blending the natural image and the computer-generated image.

5. The method of claim 1, wherein generating a training image set and spatial realism map set for the predetermined object type comprises:
   presenting, to a user, each training image of the training image set;
   receiving an annotation of each training image from the user; and
   generating a pixel level spatial realism map based on the received annotation.

6. The method of claim 5 wherein the annotation comprises one or more marked regions in each training image that appear unrealistic to the user.

7. The method of claim 6 wherein the annotation comprises one or more of a bounding polygon, a circle, and an ellipse.

8. The method of claim 1, wherein generating a training image set comprises generating the training image set using one or more of a deep convolutional generative adversarial network, a self-attention generative adversarial network (SAGAN), and a boundary equilibrium generative adversarial network (BEGAN).

9. The method of claim 1, wherein the predetermined object type is a human face.

10. The method of claim 1, wherein the predictor is implemented as a deep convolutional neural network.

11. The method of claim 1, wherein the predictor is implemented as a U-Net deep neural network.

12. An image realism predictor, comprising:
    a processor; and
    a memory storing computer program instructions which when executed by the processor cause the processor to perform operations comprising:
       generating a training image set for a predetermined object type, the training image set comprising one or more training images at least partially generated using a computer;
       generating a pixel level training spatial realism map for each training image of the one or more training images, each training spatial realism map configured to map a perceptual realism of a corresponding training image;
       training a predictor using the using the training image set and corresponding training spatial realism maps;
       receiving an image of the predetermined object type; and
       producing a spatial realism map of the received image using the trained predictor.

13. The image realism predictor of claim 12, wherein generating a training image for the predetermined object type comprises distorting at least a portion of a natural image, and wherein a corresponding spatial realism map is defined to have a low realism score in the distorted portion of the natural image and high realism score in undistorted portions.

14. The image realism predictor of claim 13, wherein distorting at least a portion of the natural image comprises swapping at least the portion of the natural image with a corresponding portion of a computer-generated image to create a combined image.

15. The image realism predictor of claim 14, wherein the processor is configured to blend the natural image and the computer-generated image.

16. The image realism predictor of claim 12, wherein generating a training image set and spatial realism map set for the predetermined object type comprises:
    presenting, to a user, each training image of the training image set;
    receiving an annotation of each training image from the user; and
    generating a pixel level spatial realism map based on the received annotation.

17. The image realism predictor of claim 16, wherein the annotation comprises one or more marked regions in each training image that appear unrealistic to the user.

18. The image realism predictor of claim 17, wherein the annotation comprises one or more of a bounding polygon, a circle, and an ellipse.

19. The image realism predictor of claim 12, wherein the processor is configured to generate the training image set using one or more of a deep convolutional generative adversarial network, a self-attention generative adversarial network (SAGAN), and a boundary equilibrium generative adversarial network (BEGAN).

\* \* \* \* \*